Figure 1:
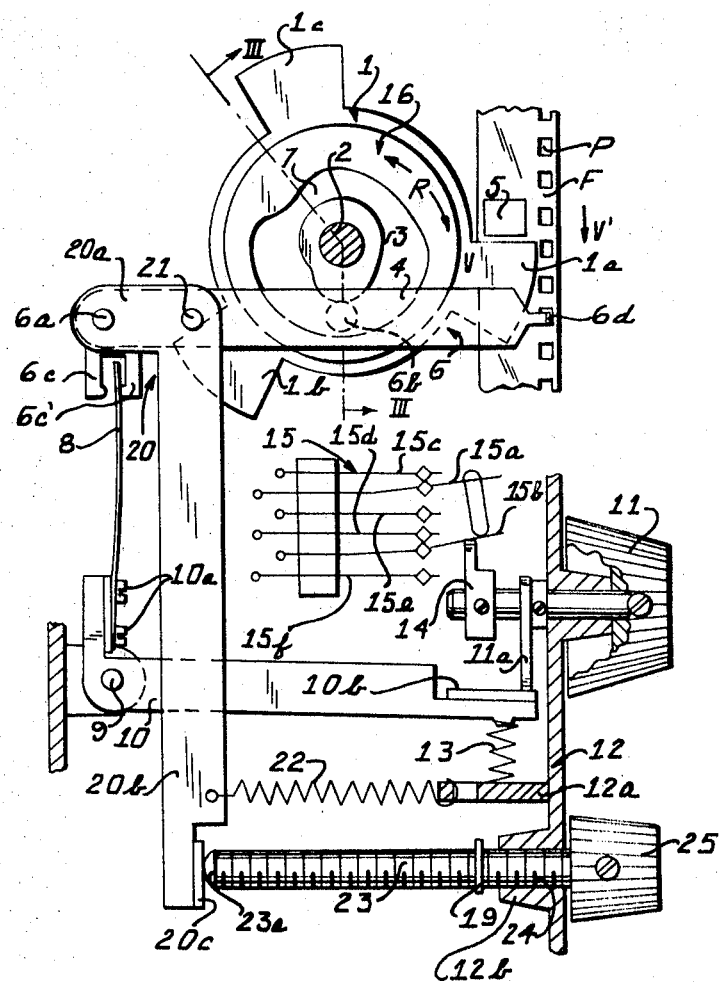

United States Patent

[11] 3,583,801

[72] Inventor: Johann Roth, Dachau, Germany
[21] Appl. No.: 872,057
[22] Filed: Oct. 29, 1969
[45] Patented: June 8, 1971
[73] Assignee: Niezoldi & Kramer G.m.b.H. Munchen-Allach, Germany
[32] Priority: Nov. 2, 1968
[33] Germany
[31] P 18 06 534.4

[54] PULL-DOWN MECHANISM FOR CINEMATOGRAPHIC APPARATUS
16 Claims, 4 Drawing Figs.
[52] U.S. Cl. .................................................. 352/173, 352/196
[51] Int. Cl. .................................................. G03b 1/22
[50] Field of Search .......................................... 352/191, 194, 195, 196; 226/62, 64, 70, 73; 352/173

[56] References Cited
UNITED STATES PATENTS
3,447,868  6/1969  Krumbien ............... 352/173
3,439,981  4/1969  Nemeth .................. 352/173
2,974,840  3/1961  Kuhnert et al. ......... 352/173

Primary Examiner—S. Clement Swisker
Attorney—Michael S. Striker

ABSTRACT: A pulldown mechanism for intermittent transport of motion picture film in two directions comprises two transporting cams which are angularly offset with reference to each other to compensate for unavoidable clearance between the claw of the shuttle and the perforations. One of the cams moves the claw when the film is transported forwardly and the other cam moves the claw while the latter transports the film in rearward direction. The in-out cam is turnable with reference to the transporting cams through an angle which equals their angular displacement and is permanently engaged by the shuttle. The selector which biases the shuttle against the one or the other transporting cam also serves to reverse the direction of operation of the motor which drives the cams and the shutter.

INVENTOR
JOHANN ROTH

INVENTOR
JOHANN ROTH 3,583,801

PULL-DOWN MECHANISM FOR CINEMATOGRAPHIC APPARATUS

BACKGROUND OF THE INVENTION

The present invention relates to cinematographic apparatus in general, and more particularly to improvements in pulldown mechanisms which are utilized for intermittent transport of motion picture film along the film gate. Still more particularly, the invention relates to improvements in pulldown mechanisms of the type wherein the claw-carrying lever or shuttle is designed to transport the film forwardly or backwards.

When the shuttle of a pulldown mechanism transports the film forwardly, its claw engages the leading edge of the adjacent perforation to advance the film by the length of a frame prior to being withdrawn from such perforation by the customary in-out cam. When the direction of film transport is reversed, the claw engages the trailing edge (at the opposite end) of the adjacent perforation. This causes a shift in the position of film frames with reference to the gate, and such shift is due mainly to unavoidable clearance between the claw and the perforations of motion picture film. The clearance is necessary in order to insure friction-free entry and withdrawal of the claw from perforations, and the extent of such clearance is sufficient to cause undesirable shifting of film frames with reference to the gate whenever the drive for the shuttle is reversed. As a rule, the extent of the shift in the position of film frames corresponds to or is directly proportional to the clearance between the leading or trailing edge of the perforation and the claw.

In certain recent types of cinematographic apparatus wherein the shuttle is arranged to transport the film forwardly and backwards, the means which compensates for clearance between the claw of the shuttle and the leading or trailing edge of the perforation includes a compensating mechanism which can automatically change the position of the pivot for the shuttle. Such compensating mechanism is rather complicated, costly and prone to malfunction; it is actuated in response to operation of the selector which effects a change in the direction of film transport.

Certain other types of cinematographic apparatus utilize a pulldown mechanism wherein the compensation for unavoidable clearance between the claw of the shuttle and the perforations of motion picture film is effected by means of a conical cam which is movable axially and is also turnable about its axis in response to actuation of the selector which is used to change the direction of film transport. It is also known to provide the shuttle with a follower which changes its position in response to actuation of the selector to thereby compensate for clearance between the edges of the perforations and the claw. A drawback of the just described pulldown mechanisms is that the movements of the shuttle during forward and backward transport of the motion picture film are effected by one and the same cam. A spring biases the follower of the shuttle against the cam so that the latter can insure positive displacement of the claw only while the film is being transported in one direction, e.g., forwardly, but not during transport in the other direction. Consequently, as soon as the resistance of the film to transport in the other direction increases only slightly beyond an average value, the claw cannot insure uniform transport of the film so that the film frames are not placed into accurate registry with the gate. It can happen that the film remains at a standstill while the claw moves back and forth and causes damage to the material around the perforations.

Another drawback of presently known pulldown mechanisms is that the duration of the so-called dark cycle during which the shutter overlies the film gate is relatively long because a greater part of each revolution of the shutter is necessary to cover the gate in order to insure that the image is not projected during transport of the film in forward or rearward direction. Such relatively long dark cycles are necessary irrespective of whether the clearance between the claw and the perforation is compensated for by changing the position of the pivot for the shuttle, by using an axially and angularly movable compensating cam, or by using a shuttle with an adjustable follower.

SUMMARY OF THE INVENTION

An object of the present invention is to provide a novel and improved pulldown mechanism which is capable of automatically compensating for unavoidable clearance between the claw of the shuttle and the edges of perforations in motion picture film without necessitating longer dark cycles and without the utilization of complicated, costly, bulky and expensive auxiliary equipment.

Another object of the invention is to provide a pulldown mechanism of the just outlined character wherein the claw is positively moved during transport of film, regardless of whether the film is being transported forwardly or backwards.

A further object of the invention is to provide the pulldown mechanism with novel means for eliminating even minor misalignment between the film frames and the film gate.

Still another object of the invention is to provide a novel system of cams for use in a pulldown mechanism of the above outlined character.

An ancillary object of the invention is to provide a novel selector device for use in the improved pulldown mechanism to effect changes in the direction of film transport.

The invention is embodied in a cinematographic apparatus for use with motion picture film having at least one row of perforations. The apparatus comprises a film gate, reversible drive means (preferably including a reversible electric motor or a motor which rotates in a single direction and drives a main shaft through the intermediary of a reversible transmission), shutter means rotated by the drive means, and a pulldown mechanism comprising a shuttle provided with film-advancing claw means, first cam means including first and second transporting cams which are rotated by the drive means and respectively have first and second cam portions arranged to effect movements of the claw means in and counter to the direction of desired film transport while the claw means engages the adjoining perforation of the film, the cam portions being angularly offset with reference to each other through a predetermined angle which is selected in such a way that it insures appropriate compensation for necessary clearance between leading or trailing edges of the perforation and the claw means when the latter transports the film forwardly or backwards, selector means operable to maintain the shuttle in engagement with one of the transporting cams at a time so that the shuttle respectively receives motion from the first and second cams when the drive means respectively rotates in first and second directions, and in-out cam means operative to effect movements of the claw means into and away from the adjoining perforations. In accordance with a feature of the invention, one of the cam means (preferably the in-out cam means) is turnable with reference to the other cam means though an angle which at least approximates the aforementioned predetermined angle. This insures that the in-out cam means is in an optimum angular position with reference to the first transporting cam when the claw means transports the film forwardly and with reference to the second transporting cam when the claw means transports the film rearwardly.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

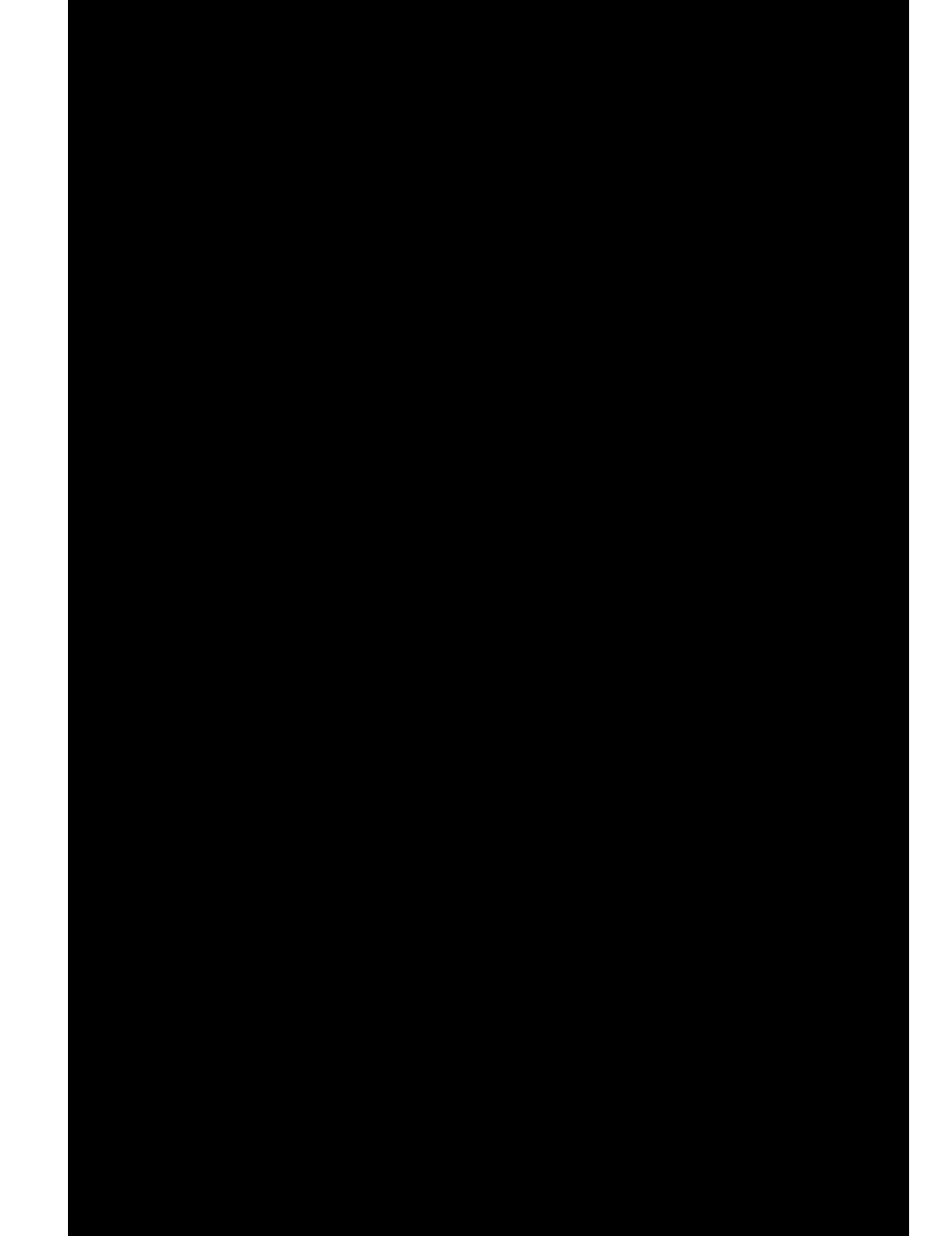

in-out cam 7 can turn with reference to the carrier 16 and transporting cams 3, 4. When the contacts of the reversing switch 15 assume the positions shown in FIG. 1, the angular position of the in-out cam 7 with reference to the transporting cams 3, 4 is such that the projection 17 bears against the radial stop face 18a. While the main shaft 2 rotates in a clockwise direction and the follower 6b engages the cam 3 between the lines A, B, the follower 6B tracks the cam portion or flank 7a of the in-out cam 7 which causes the claw 6d to penetrate into the adjoining perforation. The flank 7a rises in the direction (arrow V) of clockwise rotation of the carrier 16. Penetration of the claw 6d into the adjoining perforation P is completed just before the cam 3 causes the shuttle 6 to pivot in a clockwise direction (arrow V') so as to advance the film F forwardly by the length of a frame. When the transport of the film F is completed, the flank 7b of the in-out cam permits the claw 6d to leave the adjoining perforation (between the lines C, D) so that the film is not damaged while the shuttle 6 performs a counterclockwise pivotal movement (i.e., while the follower 6b tracks the cam portion or flank 3b of the cam 3). The transporting cam 4 performs no function when the film F is transported in the direction indicated by arrow V'.

Figure 2:
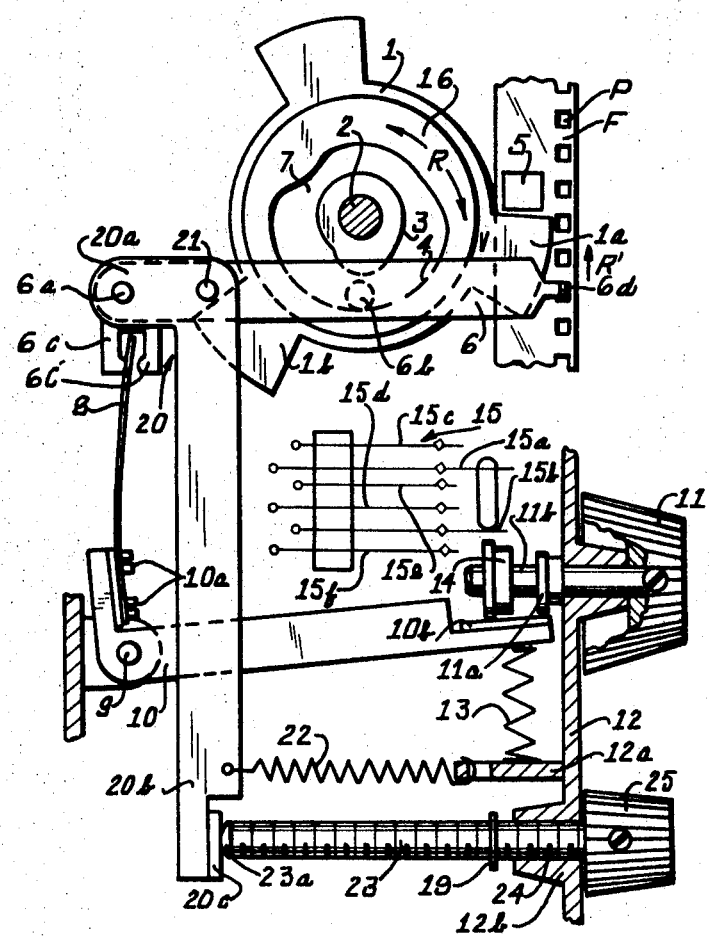
Figure 3:
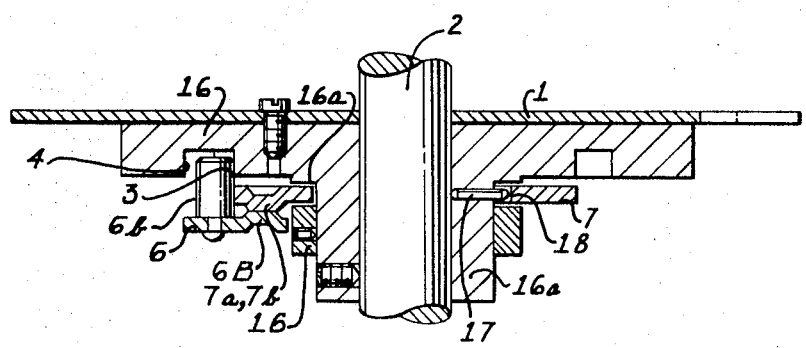

In order to reverse the direction of film transport, the user turns the selector knob 11 through about 90° whereby the arm 11a assumes the position shown in FIG. 2 and permits the spring 13 to turn the motion transmitting lever 10 in a counterclockwise direction so that the leaf spring 8 bears against the prong 6c and maintains the follower 6b in engagement with the face of the transporting cam 4. The follower 6B continues to track the end face of the cam 7. As stated before, the transporting cam 4 is angularly offset with reference to the transporting cam 3 by about 120° (the effective length of the groove 18 in the carrier 16). The face of the cam 4 is configurated in such a way that the necessary clearance between the claw 6d and the perforations P does not adversely affect the film transport in response to a change in the direction of rotation of the main shaft 2. This is achieved by selecting the configuration of the face on the cam 4 in such a way that, when the camera is ready to transport the film backwards, the claw 6d is adjacent to the upper edge of the adjoining perforation P in the film F when the shuttle 6 begins a movement which causes the film to move in the direction indicated by arrow R' (FIG. 2). This insures that the cam 4 automatically compensates for the change in the position of film frames in response to a change in the direction of film transport; such change in the position of the film frames is due to the necessary clearance between the claw 6d and one edge of the adjoining perforation P.

Figure 4:
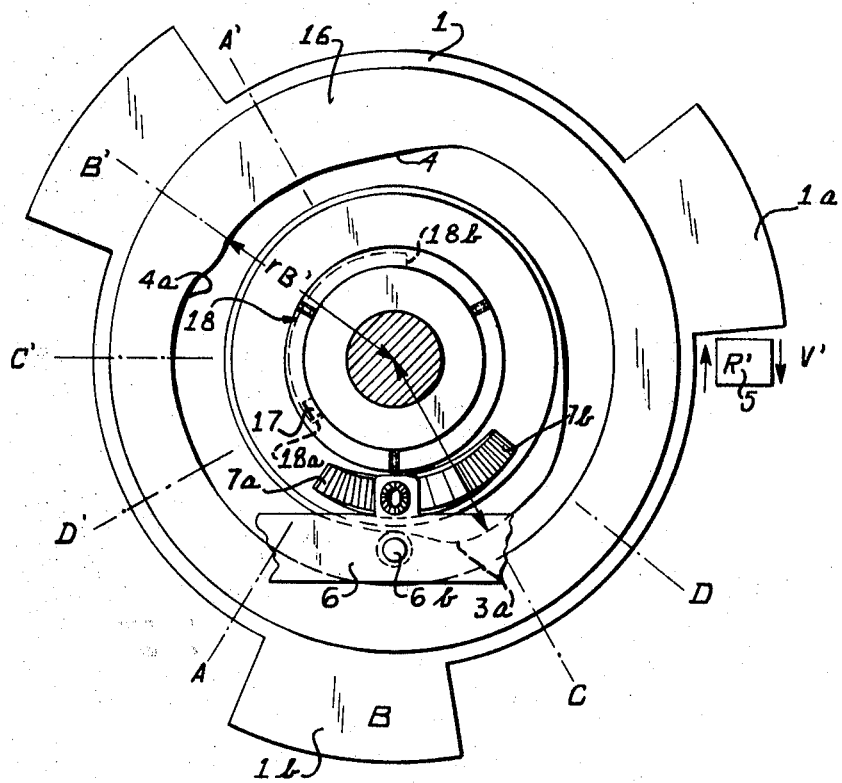

When the main shaft 2 is set in motion in a counterclockwise direction (arrow R in FIG. 2), the film F is transported stepwise in the direction indicated by arrow R'. The transport of film is effected by the rising cam portion or flank 4a of the cam 4. The penetration of the claw 6d into the adjoining perforation P begins at D' and ends at C' (FIG. 4). The film is transported backwards by the length of a frame between the points C', B'. The claw 6d is withdrawn from the adjoining perforation P between B' and A'. The position of the rising flank 4a on the cam 4 with reference to the vane 1b of the shutter 1 is selected in such a way that the circumferential length of the vane 1b need not appreciably exceed the angular distance between the lines C', B' of FIG. 4 (transport of film F in the direction R' by the length of a film frame). The position of the film frames with reference to the gate 5 during backward transport of the film F is determined by the radius rB' of the face on the cam 4.

When the main shaft 2 begins to rotate in the direction indicated by arrow R, the in-out cam 7 is initially held by friction (with the follower 6B) against movement with the carrier 16. The groove 18 thereby rotates in a counterclockwise direction and the carrier 16 begins to rotate the cam 7 when the projection 17 is engaged and entrained by the radial stop face 18b in the groove 18. The circumferential length of the groove 18 is selected in the aforedescribed way, i.e., that the cam 7 is in an optimum position with reference to the cam 4 when the latter cooperates with the follower 6b to effect transport of the film F in the direction indicated by arrow R'. The flank 7b of the cam 7 (this flank 7b rises in the direction indicated by arrow R) then causes the follower 6B to effect penetration of the claw 6d into the adjoining perforation P just before the cam 4 causes the claw 6d to transport the film by the length of a frame (arrow R'), and the flank 7 a (which descends as considered in the direction of arrow R) permits the claw 6d to leave the adjacent perforation P when the transport of the film by the length of a frame is completed and before the claw 6d begins to move in the direction indicated by arrow V'.

The reversible motor M of the apparatus is controlled by the aforementioned selector knob 11 through the intermediary of the reversing switch 15. In the position shown in FIG. 1, the contacts 15a, 15b of the switch 15 respectively engage the contacts 15c, 15d. The windings of the motor M are then connected with the energy source in such a way that the main shaft 2 rotates in the direction indicated by arrow V as soon as the master switch is closed. The contacts 15a, 15b are elastic and automatically engage the contacts 15e, 15f when the trip 14 assumes the position shown in FIG. 2. The motor M is then ready to rotate the main shaft 2 in the direction indicated by arrow R as soon as the master switch is closed. Since the selector knob 11 also serves as a means for resetting the shuttle 6, the reversal in the direction of rotation of the motor M is invariably synchronized with the reversal of the position of the shuttle 6.

It is clear that the main shaft 2 can be rotated in two directions without necessarily resorting to a reversible electric motor. For example, the cinematographic apparatus may embody a motor which rotates in a single direction and a reversible transmission (not shown) which is installed between the output shaft of the motor and the main shaft 2. The transmission may comprise two electromagnetically operated clutches one of which is engaged when the switch 15 assumes the position shown in FIG. 1 and the other of which is engaged when the switch 15 is caused to assume the position shown in FIG. 2. The contacts 15a—15d then complete the circuit of an electromagnet which energizes the first clutch and the contacts 15a, 15b, 15e, 15f complete the circuit of a second electromagnet which energizes the second clutch. If the transmission is of the type wherein the output shaft normally rotates in a given direction and the direction of rotation of such shaft is reversed in response to engagement or disengagement of a single clutch, the switch 15 can be replaced by a simpler switch which is open in one position and closed in the other position of the trip 14.

The cinematographic apparatus is further provided with an adjusting mechanism which can effect precision setting of the shuttle 6 and of its claw 6d. This adjusting mechanism enables the user to adjust the position of film frames with reference to the gate 5. The mechanism comprises an adjusting member here shown as a two-armed lever 20 which is pivotable about a fixed pivot member 21 and the shorter arm 20a of which supports the pivot pin 6a for the shuttle 6. The longer arm 20b of the lever 20 is coupled to one end of a helical spring 22 which is attached to the bracket 12a and urges a pad 20c of the arm 20b against the rounded tip 23a of an externally threaded adjusting screw 23 provided with a knob 25 adjacent to the selector knob 11. The external threads of the screw 23 mate with internal threads 24 provided in a boss 12b of the housing 12. The screw 23 has a collar 19 which determines the maximum extent of axial adjustment in one direction. The plane of the lever 20 is substantially parallel to the plane of the shuttle 6.

When the knob 25 is rotated in a direction to move the screw 23 to the right, as viewed in FIG. 1, the spring 22 pivots the lever 20 in a counterclockwise direction and the pivot member 6a moves downwardly. This "raises" the frames of the film F into registry with the gate 5. The frames are "lowered" in response to rotation of the knob 25 in a direction to move the screw 23 to the left, as viewed in FIG. 1. The just mentioned corrections in the position of the claw 6d do not affect the automatic compensation for changes in the direction of film transport, namely, that compensation which is due to angular displacement of the transporting cams 3, 4 and the novel mounting of the in-out cam 7.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What I claim as new and desire to be protected by Letters Patent is set forth in the appended claims:

1. In a cinematographic apparatus for use with a film having a row of perforations, a combination comprising a film gate; reversible drive means; shutter means rotated by said drive means; and a pulldown mechanism comprising a shuttle provided with film-advancing claw means, first cam means including first and second transporting cams rotated by said drive means and respectively having first and second cam portions arranged to effect movements of said claw means in and counter to the direction of desired film travel while said claw means engages a perforation of the film, said cam portions being angularly offset with reference to each other through a predetermined angle, selector means operable to maintain said shuttle in engagement with one of said cams at a time so that the shuttle respectively receives motion from said first and second cams when said drive means rotates in first and second directions, and in-out cam means operative to effect movements of said claw means into and away from the adjoining perforations, said in-out cam means receiving motion from said drive means and one of said cam means being turnable with reference to the other cam means through an angle which at least approximates said predetermined angle.

2. A combination as defined in claim 1, wherein said selector means includes means for biasing said shuttle against one of said transporting cams at a time.

3. A combination as defined in claim 1, wherein said shutter means includes vane means overlying said gate during engagement of said shuttle with said first and second cam portions.

4. A combination as defined in claim 1, further comprising reversing means actuatable to reverse the direction of rotation of said drive means, said selector means comprising means for actuating said reversing means simultaneously with operation of said selector means to move said shuttle from engagement with one of said transporting cams into engagement with the other transporting cam.

5. A combination as defined in claim 1, wherein said one cam means is said in-out means and said drive means comprises a shaft, said pulldown mechanism further comprising a carrier for said transporting cams, said carrier being mounted on said shaft and supporting said in-out cam means for movement about the axis of said shaft within said predetermined angle.

6. A combination as defined in claim 5, wherein said carrier comprises stop means operative to rotate said in-out cam means upon a reversal in the direction of rotation of said drive means and after said shaft completes a movement through said predetermined angle.

7. A combination as defined in claim 6, wherein said in-out cam means comprises a projection and said carrier is provided with an elongated arcuate groove receiving said projection, said carrier having two faces located at the ends of said groove and constituting said stop means.

8. A combination as defined in claim 1, wherein said shuttle is pivotable into and from engagement with said transporting cams and wherein said selector means comprises a motion transmitting member movable in two directions and having an elastic extension engaging said shuttle so that said extension biases the shuttle against one of said transporting cams when the motion transmitting member is moved in a first direction and against the other transporting cam when said motion transmitting member is moved in the other direction.

9. A combination as defined in claim 8, wherein said shuttle comprises two prongs and said extension includes a leaf spring disposed between said prongs.

10. A combination as defined in claim 8, wherein said shuttle comprises a first follower which engages one of said transporting cams at a time and a second follower which is in permanent engagement with said in-out cam means.

11. A combination as defined in claim 8, wherein said selector means further comprises actuating means movable between first and second positions to thereby effect movements of said motion transmitting member between said positions thereof, and further comprising reversing means for said drive means, said reversing means including switch means controlled by said actuating means to respectively prepare said drive means for rotation in first and second directions in response to movement of said motion transmitting member between said positions thereof.

12. A combination as defined in claim 11, wherein said drive means comprises a rotary shaft supporting said shutter means, said cams and said in-out cam means and reversible electric motor means operatively connected with said shaft, said switch means being in circuit with said motor means.

13. A combination as defined in claim 1, wherein said drive means comprises a shaft supporting said shutter means, said cams and said in-out cam means, prime mover means and reversible transmission means connecting said motor means with said shaft, said selector means including means for reversing said transmission means in response to operation to move said shuttle from engagement with one of said transporting cams into engagement with the other transporting cam or vice versa.

14. A combination as defined in claim 1, further comprising adjusting means for changing the position of said shuttle with reference to said transporting cams independently of said selector means.

15. A combination as defined in claim 14, wherein said shuttle is pivotable with reference to said transporting cams and wherein said adjusting means comprises means for changing the position of the pivot axis for said shuttle.

16. A combination as defined in claim 15, wherein said means for changing the position of the pivot axis for said shuttle comprises a lever pivotally supporting said shuttle and turnable about a fixed axis, and means for pivoting said lever about said fixed axis to thereby effect movements of said claw means in or counter to the direction of desired film travel independently of said transporting cams.